United States Patent [19]
Ottenstein et al.

[11] Patent Number: 5,637,135
[45] Date of Patent: Jun. 10, 1997

[54] CHROMATOGRAPHIC STATIONARY PHASES AND ADSORBENTS FROM HYBRID ORGANIC-INORGANIC SOL-GELS

[75] Inventors: Daniel M. Ottenstein, State College; Carlo G. Pantano, Pennsylvania Furnace, both of Pa.

[73] Assignee: Capillary Technology Corporation, State College, Pa.

[21] Appl. No.: 494,470

[22] Filed: Jun. 26, 1995

[51] Int. Cl.$^6$ .......................... B01D 15/08; B01D 53/04
[52] U.S. Cl. ................... 96/101; 96/108; 96/154; 55/524
[58] Field of Search ................ 55/524; 96/101, 96/108, 153, 154

[56] References Cited

U.S. PATENT DOCUMENTS

| | | | |
|---|---|---|---|
| 2,676,182 | 4/1954 | Dandt et al. | 280/448.2 |
| 3,500,616 | 3/1970 | Bossart | 96/101 |
| 3,722,181 | 3/1973 | Kirkland et al. | 96/101 X |
| 3,922,392 | 11/1975 | Kohlschütter et al. | 96/101 X |
| 4,043,905 | 8/1977 | Novotny et al. | 96/101 X |
| 4,145,506 | 3/1979 | Yamamoto et al. | 96/101 X |
| 4,177,315 | 12/1979 | Ubersax | 428/336 |
| 4,199,330 | 4/1980 | Nestrick et al. | 96/101 X |
| 4,242,227 | 12/1980 | Nestrick et al. | 96/101 X |
| 4,290,893 | 9/1981 | Hare et al. | 210/656 |
| 4,293,415 | 10/1981 | Bente et al. | 210/198.2 |
| 4,303,529 | 12/1981 | Huckins et al. | 210/635 |
| 4,389,385 | 6/1983 | Ramsay | 423/338 |
| 4,490,278 | 12/1984 | Schubert et al. | 252/299.63 |
| 4,640,909 | 2/1987 | Ramsden et al. | 502/407 |
| 4,650,784 | 3/1987 | Ramsden et al. | 502/407 |
| 4,902,413 | 2/1990 | Stout et al. | 210/198.2 |
| 4,927,539 | 5/1990 | Stevens et al. | 210/635 |
| 5,066,395 | 11/1991 | Ramsden et al. | 210/198.2 |
| 5,110,784 | 5/1992 | Williams et al. | 502/401 |
| 5,137,627 | 8/1992 | Feibush | 210/198.2 |
| 5,176,832 | 1/1993 | Dorta et al. | 210/635 |
| 5,178,756 | 1/1993 | Jarrett et al. | 210/198.2 |
| 5,224,972 | 7/1993 | Frye et al. | 55/18 |

OTHER PUBLICATIONS

Crego et al, Preparation of Open Tubular Columns for Reversed-Phase High Performance Liquid, Chromatography, Anal. Chem., 1993, 65, 1615–1621.
Schmidt, Chemistry of Material Preparation By The Sol–Gel Process, Journal of Non–Crystalline Solids, 100 (1988) 51–64.
Schmidt, New Type of Non–Crystalline Solids Between Inorganic and Organic Materials, J. of Non–Crystalline Solids, 73 (1985) 681–691.
Cowper et al, The Analysis of Gases by Chromatography, Pergamon Press (1983), 47–48.
Greene et al, Use of Silica Gel and Alumina in Gas–Adsorption Chromatography, Anal. Chem., 29, 1055 (1957).
Thornberry, Isothermal Gas Chromatographic Separation of Carbon Dioxide, Carbon Oxysulfide, Hydrogen Sulfide, Carbon Disulfide, and Sulfur Dioxide, Analytical Chemistry, vol. 43, No. 3, Mar. 1971, 452–453.
Guthrie et al, Overview of Phase Development in Capillary Gas Chromatography, LC–GC, vol. 12, No. 2, Feb. 1994.
Trash, Methylsilicones–Their Chemistry and Use as Gas Chromatographic Liquid Phases, J. Chromatographic Science, Apr. 1973, 196–198.
Coleman, Chemistry of Liquid Phases–Other Silicones J. Chromatographic Science, vol. 11, apr. 1973, 198–201.
Cowper et al, The Analysis of Gases by Gas Chromatography, Pergamon Press, (1985), Chapter 3, 38–52.
Babonneau et al, Structural Characterization of Gels Prepared from Co–Hydrolysis of Tetraethoxy Silane and Dimethyldiethoxysilane, J. Non–Crystalline Solids, 147–148, pp. 280–284, 1992.
Babonneau et al, Dimethyldiethoxysilane/Tetraethoxysilane Copolymers, Chemistry of Materials, vol. 1, No. 5, 1989, 554–558.
Huang et al, Structure–Property Behavior of New Hybrid Materials Incorporating Oligomeric Species into Sol–Gel Glasses, Macro–Molecules, vol. 20, No. 6, 1987, 1322–1330.
Mackenzie et al, Rubbery Ormosils and their Applications, J. of Non–Crystalline Solids 147 & 148 (1992) 271–279.
Leu et al, Organically Modified Sol–Gel Sensors, Analytical Chemistry, vol. 67, No. 1, Jan. 1, 1995, 22A–30A.
Guizard et al, Hybrid Organic–Inorganic Materials Applied to Membrane Preparation, New J. Chem., 1994, 18, 1097–1107.
Sydor et al, Comparison of Porous Copolymers and Related Adsorbents for the Stripping of Low Molecular Weight Compounds from a Flowing Air Stream, Anal. Chem. 1978, 50; 1842–1847.
Guo et al, A Stationary Phase for Open Tubular Liquid Chromatography and Electrochromatography Using Sol–Gel Technology, Anal. Chem. 1995, 67, 2511–2516.

*Primary Examiner*—Robert Spitzer
*Attorney, Agent, or Firm*—Alex Mich, Jr.

[57] ABSTRACT

Chromatographically active stationary phases and adsorbents are made from sol-gels produced by the hydrolysis and condensation of alkoxysilanes that contain hydrolyzable alkoxy groups and non-hydrolyzable organo groups. The organo groups provide chromatographic activity in the resulting hybrid organic-inorganic material. Deposited as hybrid sol-gel coatings on solid supports, the coatings are heated to activate them. Hybrid organic-inorganic materials which contain different organic groups distributed in an inorganic network may be designed for the improved analysis of specific groups of compounds by the selection of the organo groups. Hydrocarbon mixtures may be advantageously analyzed by such hybrid materials.

12 Claims, 7 Drawing Sheets

CHROMATOGRAPHIC STATIONARY PHASES AND ADSORBENTS FROM HYBRID ORGANIC-INORGANIC SOL-GELS

TECHNICAL FIELD

This invention relates in general to chromatographic separation columns, adsorption columns, and to hybrid sol-gels and stationary phases and adsorbents of the hybrid sol-gels. The invention also relates to the adsorption and chromatographic analysis of hydrocarbons.

BACKGROUND ART

Chromatographic separation columns are the heart of well-developed analytical systems. The chromatographic column may be a metal or glass tube filled with a solid, inert, particulated support coated with a stationary phase that causes the separation of components or analytes in a test sample or filled with uncoated particles that have surfaces that are chromatographically active. These columns are known as packed columns. The column may also be a long, very small diameter open tube with the interior surface of the tube coated with a stationary phase. These very small diameter open tubes are known as capillary columns. Both types of columns are used in gas chromatography. The active stationary phase in either packed or capillary column gas chromatographs may be a liquid or a solid. If liquid, the procedure is known as gas-liquid chromatography (GLC). If solid, the process is called gas-solid chromatography (GSC). In gas-liquid chromatography, the sample dissolves in the stationary phase. The interaction of the sample component and the stationary phase and the retention time is based on solubility. In gas-solid chromatography, the sample-stationary phase interaction and the retention time is based on adsorption.

The solid stationary phases in gas chromatography are high surface area materials which cause the separation by the interaction of the surface with the sample analytes or compounds. In the packed columns, materials such as silica gel, porous silica, synthetic zeolites or molecular sieves, alumina, activated carbon, graphitized carbon, carbon molecular sieves and styrene divinylbenzene resins have been used. Inorganic materials, such as silica gel, porous silica, molecular sieves, and alumina are activated by heating to drive off water and to make the surfaces active chromatographically, i.e. capable of chromatographic separations. Silica gel can separate lower molecular weight compounds but cannot be used for higher molecular weight compounds because of the long retention time.

Porous silica and silica gel,inorganic non-hybrid solids made specifically for use in a chromatograhic column, are not only used uncoated as stationary phases but also as the support for coatings of chromatographically active liquid layers. The activity of such layers depends on both the liquid phase used and the mount or thickness of the liquid phase used. As thicker coatings are used, the separation becomes more of a gas-liquid separation than a gas-solid separation. The column can be a metal, glass or fused silica tube containing a conventional coated or uncoated solid particle packing material or support. Solid packing materials include uncoated high surface area solids described hereinabove which can separate the components of simple, low molecular weight mixtures. Packed columns for more complex mixtures are made of a solid particle support, such as particles of diatomaceous earth, coated with high molecular weight polymeric stationary phase materials, such as methyl or methylphenyl silicones. Polydimethysiloxane (PDMS) is used extensively as a stationary phase coating in commercially available gas chromatographic columns. Packed columns are relatively easy to make and are relatively inexpensive. As the sample or analyte mixtures become more complex, the packed columns, even those with liquid stationary phases, must be made longer and longer for accurate analytical results. Packed columns of 10, 20 and even 50 feet in length have been used but become more difficult to work with because increased pressure drops make it difficult to maintain required carder gas flow rates. As will become apparent hereinbelow, the present invention provides improved packed columns attributable to the hybrid organic-inorganic solid stationary phases of this invention.

Silicone polymers are extensively employed as liquid stationary phases in gas-liquid chromatography in both packed and capillary columns. Polydimethylsiloxanes (PDMS), for example, are widely used as the stationary phase in the analysis of hydrocarbons, alcohols, aldehydes, esters, ketones and other compounds. Diphenyldimethylpolysiloxanes, methylphenylpolysiloxanes, cyanopropylmethylphenylsiloxanes and trifluoromethylpolysiloxanes are other examples of silicones that are used as liquid stationary phases. Non-silicone organic polymers, such as the various polyglycols, polyesters, high molecular weight hydrocarbons and a variety of other polymeric compounds are also used in analytical procedures where these stationary phases are chromatographically active with the compounds of the test samples. Compounds such as squalane, beta, beta-oxydipropionitrile and dinonyl phthalate are used for special separations.

Capillary columns were developed after packed columns. Because they are more efficient, they have come into broader use, particularly for the more complex mixtures to be analyzed. Even polar compounds could be analyzed in capillary columns, once the technology for deactivating the interior surfaces of fused silica tubes was developed. The stationary phase in a capillary tube is deposited on the inner surface of the tube. Silicones, especially methyl silicones such as the polydimethylsiloxane mentioned above, are used extensively in capillary columns. The stationary phase is generally applied to the inner surface of capillary tubes by the static method. In this method, the stationary phase is dissolved in a volatile solvent. The capillary tube is filled with the solution. One end of the tube is closed off. The solvent is slowly evaporated from the tube by applying a vacuum to the other end of the tube. As the solvent evaporates, the stationary phase is deposited as a uniform film on the inner surface of the tube. The stationary phases of this invention, the hybrid organic-inorganic sol-gels, have been applied to the inside surfaces of tubular supports by this method. In capillary columns with an internal diameter of 250 microns, the film thickness of stationary phases can vary from 0.1 micron to about 1 micron. In larger diameter tubes or columns, such as those with an internal diameter of 530 microns, the stationary film thickness can vary from about 0.5 to about 5 microns. As the film thickness is increased, the retention time of the sample components is increased. At the same time as the film thickness is increased, the efficiency, i.e. the peak sharpness is decreased. In order to allow for the separation of low boiling compounds, various strategies are employed.

Although not analogous to gas chromatography, open tubular or capillary columns for reverse phase high-performance liquid chromatography (HPLC) have been prepared by first developing an inorganic high surface area film on the inside surface of a fused silica tube using a sol-gel process. A layer of an organic stationary phase, for example an octadecyl group, is thereafter bonded or grafted to the high surface area silica derived from the sol-gel using dimethyloctadecylsilane. Such inorganic high surface areas have been disclosed as being prepared by the hydrolytic polycondensation and ulterior gelling of tetraethylorthosilicate (TEOS), also known by the name of tetraethoxysilane, a tetrafunctional silicon alkoxide. Bonding or grafting the organic stationary phase to the silica layer is acknowledged to be difficult. This is disclosed in detail by Crego et al in an article entitled Preparation of Open Tubular Columns for Reversed-Phase High-Performance Liquid Chromatography in Anal. Chem. 1993, 65, 1615–1621. The employment of sol-gel processes in the chromatographic field is believed to have been restricted to making essentially inorganic products. Where chromatographically active organic stationary phases have been used in conjunction with sol-gels, silica gels and porous silica, they have been applied to an already produced inorganic glass material.

Because the early sol-gel processes were primarily devoted to producing glasses or glasslike inorganic products, the organics in the monomeric precursors were primarily directed to making the alkoxides or alkoxysilanes soluble in organic solvents. Even though the organic groups of the alkoxysilanes were essentially removed during hydrolysis, there was a concern that organic residues could cause problems in the polymerization or in the heating to form the glass. More recently, however, the incorporation of organics into inorganic networks has provided composite or hybrid materials with different composite properties on a molecular scale. The properties of the sol-gel derived organic-inorganic materials depend upon the type of monomers used as starting compounds or reactants. New contact lens materials, scratch resistant coatings, oxycarbide ceramics and other organic-inorganic products are made by sol-gel processes employing inorganic network producing monomers such as TEOS, mixed with monomers, oligomers and polymers that provide the modifying organic moiety within or on the inorganic network. There has been a suggestion in the prior art that the proper selection of organic as well as inorganic functions could lead to the use of the gels as they are, e.g. as selective adsorbents or membranes. Mixtures of ethoxysilane and methylethoxysilane monomers have been investigated as sol-gel variations and reported by H. Schmidt in an article entitled New Type of Non-Crystalline Solids Between Inorganic And Organic Materials in the Journal of Non-Crystalline Solids 73(1985) 681–691. Schmidt reports the relative hydrolysis rates of some of these monomers and speculates on the possible polymerisates from different reactions. The introduction of epoxy groups is also discussed, with further speculation that the proper selection of organic as well as inorganic functions may lead to the use of gels, e.g. as selective adsorbents, membranes or in other applications. It is suggested that heat in most cases would result in the destruction of the organic functions.

Efforts to further improve the effectiveness of gas chromatographic columns continue, with considerable efforts concentrated on the stationary phase. There is a need, for example, for columns with unusual resolving ability, particularly columns with low polarity, that is, columns approaching the polarity of squalane, the least polar of any of the heretofore known stationary phases. It is difficult to coat squalane on the interior surface of a capillary column and the squalane has a very limited upper temperature limit. There is also a need to extend the ability of chromatographic columns to resolve lower boiling components. Chromatographic columns increase their ability to separate lower boiling compounds by increasing the surface areas of the stationary phase. This is evident in the earlier efforts to improve the resolving power of the various columns by using a variety of adsorbents with high surface areas including those described above.

In a related field, adsorbent columns or cartridges containing sorbents such as silica gel, alumina, activated carbon or porous polymers have been used to extract and concentrate trace compounds that are present in gases such as air and liquids such as water. The retention characteristics of the sorbents are, of course, important to the ease and efficiency of collecting trace analytes. Trace amounts of analyte pollutants in air, for example, are concentrated in such trap columns to raise the concentration to detectable levels of the available analytical equipment. This may be accomplished by continuously passing air through the column for a time sufficient to retain detectable levels. The heated inert gas of a chromatographic analyzer may be passed through the adsorbent containing the concentrated trapped analyte to elute and separate the retained compounds. The adsorbent column or cartridge is placed in the system before the chromatographic column and heated quickly, allowing the carrier gas to sweep the concentrated analyte compounds into the column, where the compounds are separated and identified. The concentration of the compounds is determined by the signal strength measured by the detector.

It would be desirable and it is an object of this invention to provide stationary phases and adsorbents having a high surface area and sufficient thermal properties using a hybrid organic-inorganic sol-gel produced from alkoxysilanes that produce an inorganic network with a modifying organic moiety within the inorganic network.

It is also an object of this invention to provide chromatographic columns that are particularly useful in analyzing hydrocarbons and adsorbent columns or cartridges that are particularly useful in concentrating hydrocarbons from streams of gases, such as air or liquids, such as water.

SUMMARY OF THE INVENTION

Briefly, the present invention includes sol-gel processing that provides a stationary phase or adsorbent that has the desirable properties of selectivity, permeability, high surface area and satisfactory thermal properties. The stationary phases of this invention are hybrid organic-inorganic materials that combine into a single network the desirable properties of an inorganic silica network and the separation or adsorbent properties of organic compounds. Alkoxysilanes with hydrolyzable groups,, particularly tetrafunctional alkoxysilanes where all four groups are hydrolyzable, such as tetraethoxysilane, that have been used in many sol-gel processes, are combined with organoalkoxysilanes that contain organic moieties with desirable adsorbent and separation properties and at least one hydrolyzable group to react with the alkoxysilane. The organoalkoxysilanes contain at least one non-hydrolyzable organic moiety to provide the organic moiety in the sol-gel product. The organoalkoxysilanes may be used alone since they contain a hydrolyzable group capable of self hydrolysis and self condensation. In most aspects of this invention, the organoalkoxysilanes are mixed with monomeric alkoxysilanes that contain four hydrolyzable groups. The mixture is hydrolyzed and co-polymerized or co-condensed to the point where the sol-gel product will form films. The film forming sol-gel solutions are deposited as coatings on either packing particles or the inner surface of capillary tubes. The deposited sol-gel films are heated to activate them so they function as improved adsorbents or stationary phases, by removing water and alcohol from the film as well as residual solvent and other lower molecular weight materials and by cross-linking the network.

BRIEF DESCRIPTION OF THE DRAWINGS

The invention will become more apparent by reading the following detailed description in conjunction with the drawings, which are shown by example only, wherein.

DESCRIPTION OF THE INVENTION

Figure 1:
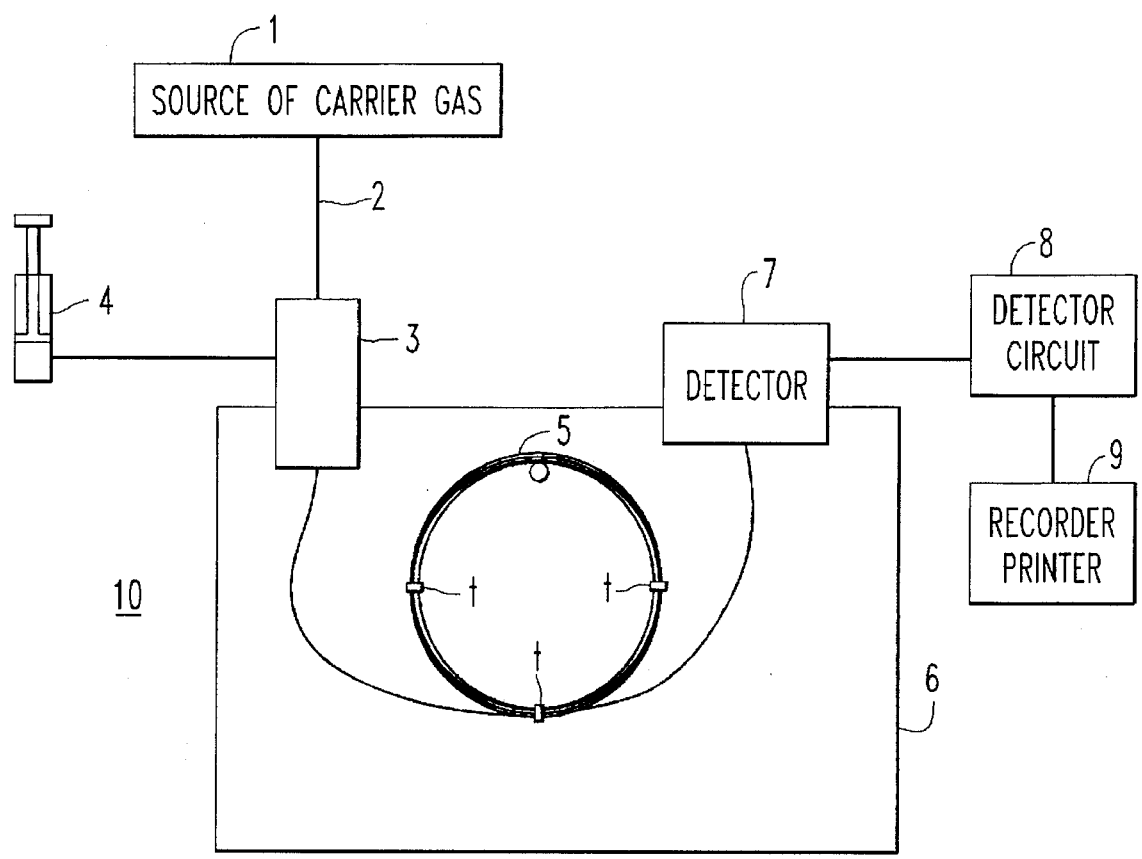
FIG. 1 is a schematic illustration of a chromatograph.

In the present invention, chromatographic stationary phases and/or adsorbent columns are prepared from hybrid organic-inorganic sol-gels. The solid phase porous hybrid organic-inorganic materials of this invention have an inorganic network of silicon and oxygen atoms but with organic substituents distributed throughout said inorganic network. The organic substituents are organic groups which are known to have active chromatographic properties, i.e. the ability to sequentially and distinctly adsorb and elute individual compounds in a mixture of compounds, so that the individual compounds may be identified and the concentration determined in the mixture. If these organic groups are present in the network at or near the surface, the individual compounds will be more easily adsorbed at the surface. Such organic groups include methyl, phenyl, cyanoethyl, cyanopropyl and trifluoro groups which are examples of groups present in organic compounds and polymers that are active stationary chromatographic phases in the prior art. Those groups are introduced into our hybrid materials by means of an alkoxysilane that contains these or other non-hydrolyzable groups together with the hydrolyzable groups of the alkoxysilane. The hydrolysis permits alkoxysilanes to polymerize by condensation while the non-hydrolyzable group or groups become part of the polymer or network. A monomeric alkyltrialkoxysilane, such as methyltrimethoxysilane has a methyl group that is not hydrolyzable and will become part of the polymer or network that is produced by the self-hydrolysis and self condensation of the methoxy groups. The hybrid materials may also be produced from a mixture of alkoxysilanes. A first alkoxysilane may be an oligomer which is the product of a partial hydrolysis and partial self-condensation that is reacted with a second monomeric alkoxysilane. To provide the desired hybrid product at least one of the alkoxysilanes should have a non-hydrolyzable organic group, a group which will be chromatographically active. The preferred hybrid organic-inorganic materials are the product of a mixture of monomers, where one monomer is a tetraalkoxy compound having the formula:

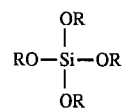

wherein R is an alkyl group having from 1 to 4 carbons, and another monomer which is described by the formula:

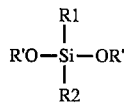

wherein R' is selected from the group consisting of methyl and ethyl groups, R1 is selected from the group consisting of hydrogen, methyl, phenyl, cyanoethyl, cyanopropyl, and trifluoropropyl groups and R2 is selected from the group consisting of methyl, phenyl, methoxy and ethoxy groups. The molar ratio of one monomer to another may be from 1 mole of the one monomer to about 0.5 to 1.25 of the another monomer. Preferably the molar ratio is about equimolar. The sol-gels may be prepared by reacting the mixture of ingredients for a time varying from about 15 minutes to about 2 hours at a temperature of from about 20° to 75° C.

Tetraethoxysilane is the preferred tetraalkoxy compound. The other monomer in the mixture may specifically be one or more of the monomeric compounds dimethyldimethoxysilane, dimethyldiethoxysilane, methyltrimethoxysilane, diphenyldiethoxysilane, phenylmethyldimethoxysilane, phenylmethyldiethoxysilane, 3-cyanopropyltriethoxysilane, 2-cyanoethyltriethoxysilane, (3,3,3-trifluoropropyl) trimethoxysilane, methyldimethoxysilane and methyldiethoxysilane. Coatings of the hybrid sol-gels may be deposited on solid support particles or in a capillary tube to act as chromatographically active materials. The commercially available capillary tubes that were used in the examples described hereinbelow were coated with a polyimide film. Because the polyimide film is an organic material, the heating to activate the hybrid coating was limited so that the polyimide would not be degraded. Other capillary tubes, without such temperature limiting coatings could be heated to higher activation temperatures to reduce the time to activate or to provide hybrid coatings that could be used at even more elevated temperatures.

Mixtures of organic compounds may be analyzed in gas chomatographs by vaporizing the mixture and contacting the mixture with a solid phase hybrid organic-inorganic material of this invention. As will appear hereinafter, hydrocarbon mixtures are most advantageously analyzed with hybrid coatings produced from a mixture of tetraethoxysilane, dimethyldiethoxysilane and cyanopropyltfiethoxysilane.

One advantage that attends this invention is the ability to design cbxomatographically active solid stationary phases for the analysis of specific types of mixtures. The methyl group provided by the hybrid material produced from TEOS and DMDES can be employed to analyze hydrocarbon mixtures. Even better analytical results with hydrocarbons are obtained when a portion of the DMDES is replaced with CPTES. Combinations of other organic groups are expected to provide further advantages with other compound mixtures to be analyzed or simply adsorbed in cartridges that can be later analyzed. While hybrid organic-inorganic materials are known in the art, it is believed that the hybrid organic-inorganic materials produced from a monomeric tetraalkoxysilane such as TEOS with a plurality of monomeric organoalkoxysilanes where the organo groups are different in the plurality of monomers are novel materials. Such hybrid materials permit the design of particularly advantageous chromatographic phases or solid adsorbents.

DESCRIPTION OF THE PREFERRED EMBODIMENTS

Illustrated in FIG. 1 is a known gas chromatographic system 10 comprising a supply or source of an inert compressed gas 1, typically helium, hydrogen or nitrogen, called the carrier gas or mobile phase, a tube 2 for supplying the gas to a heated sample injection station 3, a syringe 4 for injecting the sample into station 3 where it is vaporized and transported by the carrier gas into a chromatographic column 5 where the components of the sample are separated. The column 5 is housed in a thermostatted bath 6 to regulate the temperature. Each of the sample components will spend a different time in the stationary phase and consequently the components will emerge at the end of the column separated. The components, which are eluted separately and sequentially, exit the column and enter the detector 7, also housed in bath 6. The detector senses the exiting eluted components and generates a signal that is processed in circuit 8 and sent to a millivolt recorder-printer 9 where a chromatogram is generated on paper. The chromatogram that is produced is a plot of time on the horizontal axis and the composition of the sample on the vertical axis. For a given column and a given set of operating conditions of temperature and carrier gas flow, the time spent in the column is a constant and the time can be used to identify the compound. By the intensity of the responses of the detector or the peaks in a chromatogram, the concentration of the components in the test sample can be determined. Such systems are commercially available. The instrument employed in connection with this invention was a Perkin-Elmer Corporation (Norwalk, Conn.) Model 8500, equipped with a flame ionization detector and a split/splitless injector. The data was recorded and chromatograms produced on a Perkin-Elmer GP-100 Graphics Printer.

Figure 2A:
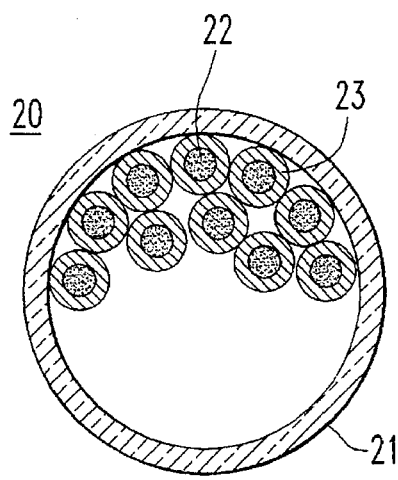
FIGS. 2 illustrate, in cross-section, two chromatographic columns of this invention, 2A showing a packed column and 2B showing a capillary column.

Referring now to FIG. 2A, there is illustrated in cross-section, a packed column 20. For clarity, the dimensions have been exaggerated and distorted. For example, a 2 meter steel tube 21 having an outer diameter of ⅛ inch may be packed with a calcined diatomaceous earth support, available from the Celite Corporation, Lompoc, Calif., under the proprietary name Chromosorb P 100/120 mesh particles. The particles 22, a portion of which are illustrated in cross-section, may be coated with a layer 23 of a hybrid organic-inorganic sol-gel of this invention. The activated coating 23 may, for example, contain methyl substituents distributed throughout an inorganic network produced by the hydrolysis and self condensation of methyltriethoxysilane or from the co-hydrolysis and co-condensation of dimethyldiethoxysilane (DMDES) and tetraethoxysilane (TEOS) which also produces an organic-inorganic material having organic groups distributed in an inorganic network. The reactants are heated until a film-forming sol-gel is produced. The sol-gel, diluted with solvent, is deposited as a film on the support. The coating is then heated so that it becomes chromatographically active.

Figure 2B:
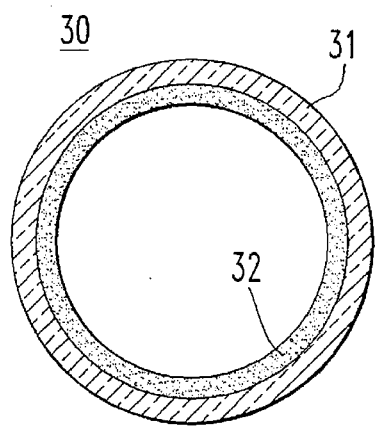

FIG. 2B is an illustration of a capillary column 30 in accordance with this invention. The fused silica capillary tube 31 has an inner diameter of 0.25 mm. A hybrid organic-inorganic sol-gel coating 32 of this invention is deposited on the inner surface of the tube. This coating may also, for example, be derived from DMDES and TEOS, as described above in connection with a packed column. The outer surface of the fused silica tube is typically coated with a polyimide resin (not illustrated).

PREPARATION OF HYBRID SOL-GELS

Figure 3:
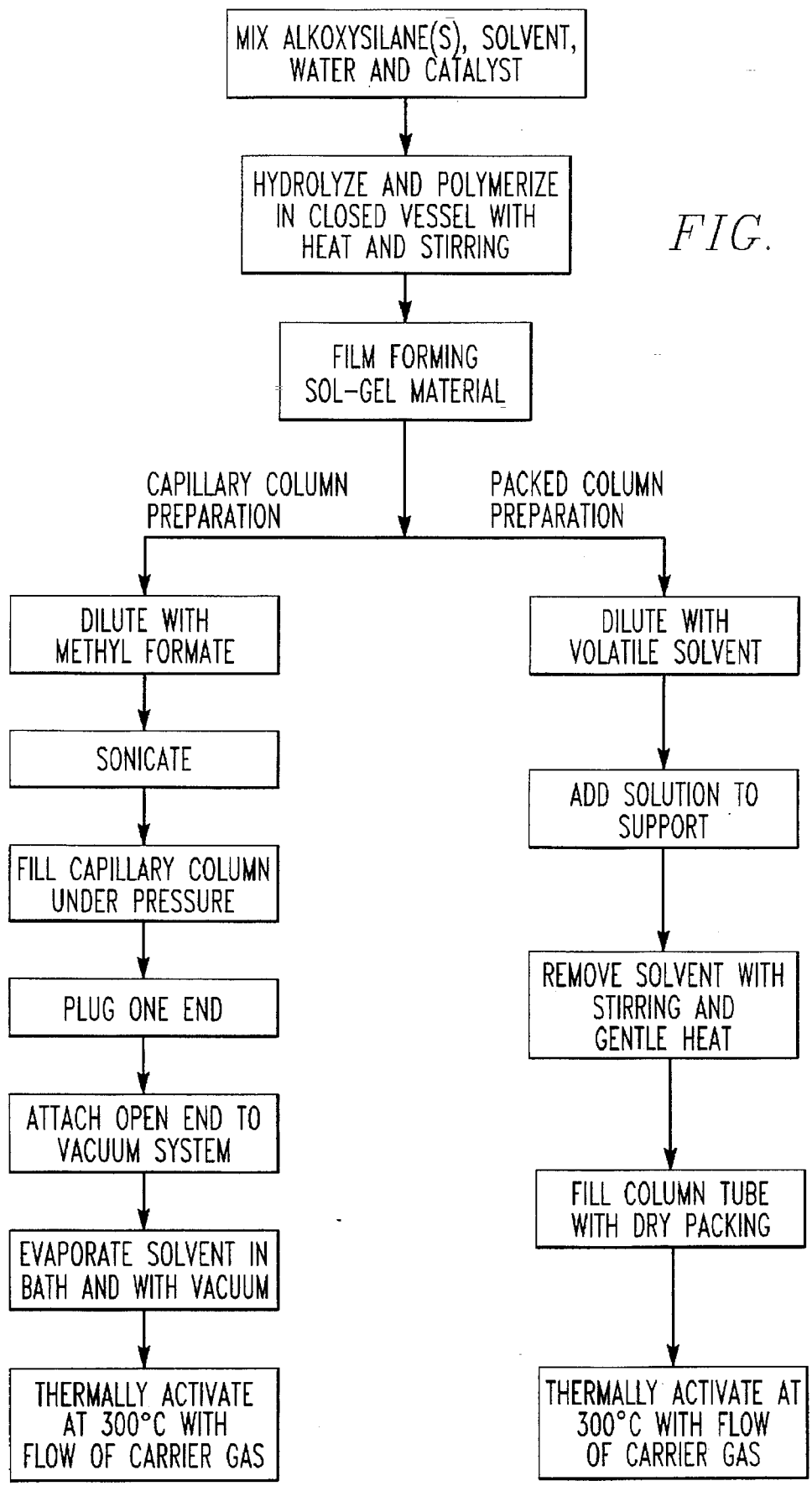
FIG. 3 is a flow chart outlining the process steps that are employed in producing sol-gels and capillary and packed columns in accordance with this invention.
Figure 4A:
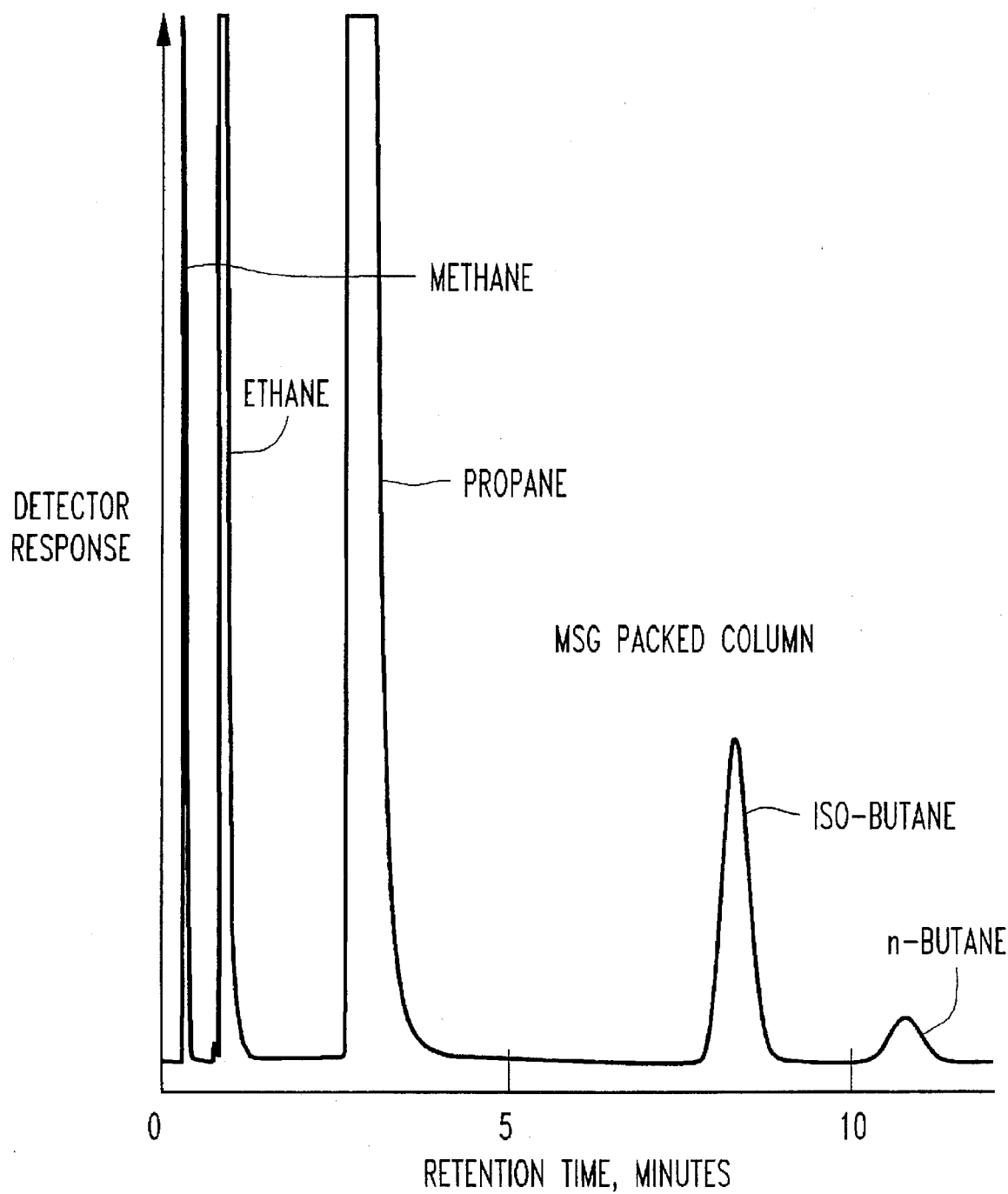
FIGS. 4 illustrate chromatograms comparing hydrocarbons separated in 4A by a packed column with a stationary phase of this invention and in 4B by a packed column with a prior art stationary phase.

Referring now to the flow chart of FIG. 3, the first step is to mix the ingredients, e.g. alkoxysilanes, solvent and water containing catalyst together in a closed reactor. The mixture is heated and stirred at 60° C. for a period of 30 minutes to hydrolyze the alkoxy groups and then condense the hydroxyl groups to form a film-forming sol-gel. The non-hydrolyzable organic groups that are present will provide the organic moiety distributed in the inorganic network. The following ingredient mixture has been used in preparing sol-gels of this invention, particularly sol-gels that are employed to coat the particles of packed columns such as the one illustrated in FIG. 2A and specifically the packed column that was used to generate the chromatogram set forth in FIG. 4A. This sol-gel may also be used to make adsorbent columns such as the one illustrated in FIGS. 6:

EXAMPLE A

| | |
|---|---|
| Tetraethoxysilane (TEOS) | 1 mole |
| Dimethyldiethoxysilane (DMDES) | 1 mole |
| Solvent (Acetone) | 4 moles |
| Water (Acidified to pH 1 with HCl) | 3.5 moles |

Figure 5A:
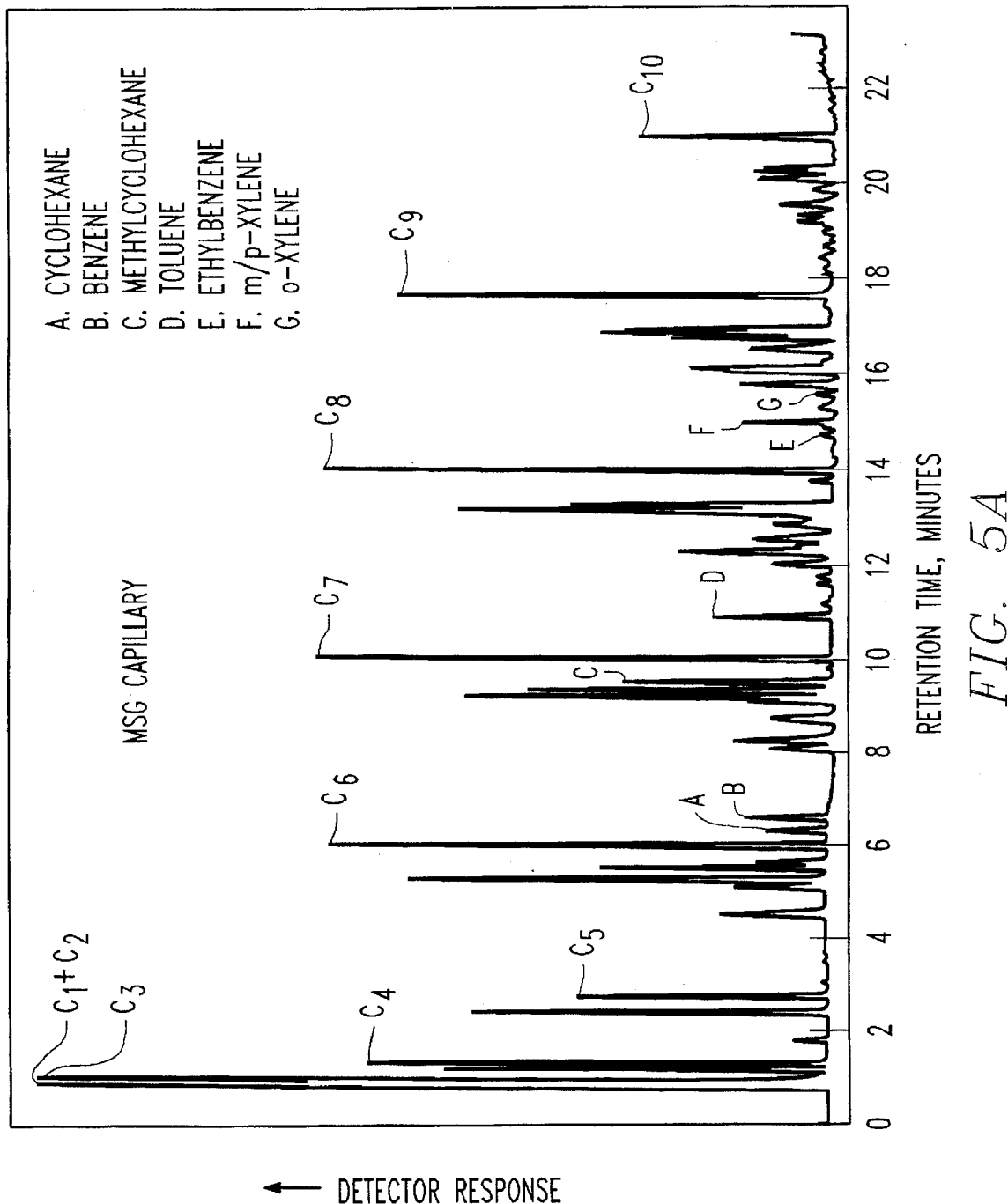
FIGS. 5 illustrate chromatograms of hydrocarbons separated in 5A by a capillary column with a stationary phase of this invention and in 5B by a capillary column with a stationary phase of the prior art, and In FIGS. 6, 6A is a longitudinal side view of an adsorbent trap column or cartridge of this invention and 6B is a cross-sectional view along 6B—6B of 6A.

Again referring to FIG. 3, the following ingredients were mixed together in a closed reactor, heated with stirring for 30 minutes at 60° C. to form a film-forming sol-gel. This sol-gel may be used to provide the chromatographically active stationary phase on the interior wall of capillary columns or on the particles of packed columns. It was used to prepare the capillary column used to generate the chromatogam set forth in FIG. 5A and the data presented in Table XVIII.

EXAMPLE B

| | |
|---|---|
| Tetraethoxysilane (TEOS) | 1.0 mole |
| Dimethyldiethoxysilane (DMDES) | 0.92 mole |
| 3-Cyanopropyltriethoxysilane | 0.08 mole |
| Acetone (Solvent) | 4.0 moles |
| Water (Aciditied to pH 1 with HCl) | 3.50 |

After the reaction producing the polymeric sol-gel has been completed, i.e. reaches a film forming stage, the sol-gel solution is kept in a dosed container to prevent evaporation of the solvent. It is stored at about 5° C. to retard deterioration. In a dosed container at that temperature the sol-gel has a shelf life of approximately 3 days for use in preparing capillary columns. It has a longer useful shelf life for the preparation of coated particles for packed columns and adsorbent cartridges, of about one to two weeks.

The desirable film forming stage may be conveniently determined by sampling the reacting sol-gel solution and evaporating a drop on a glass slide. A uniform and coherent circular film indicates a satisfactory reaction and end-point and that good columns may be prepared. When the solution produces a poor circular film or if no film is produced, the sol-gel will produce less desirable columns.

The sol-gel solutions described above will contain about 20% solids based on the total weight of the solution. The solids content is measured by placing 1.00 gram of the solution in an evaporating dish or watch glass and removing the volatiles with a heat lamp. This takes about 30 minutes and the solids residue reaches a final temperature of approximately 140° C.

PACKED COLUMN PREPARATION

Referring again to FIG. 3, a packed column containing 35% solids on diatomaceous earth support particles was prepared from the following:

| | |
|---|---|
| Diatomaceous earth (Chromosorb P 100/120) | 5.0 grams |
| Example A sol-gel (13.45 grams, 20% solids solution) | 2.69 grams |
| Acetone solvent | 5 ml |

The Example A sol-gel product is diluted with acetone solvent. The solution is added to the diatomaceous earth support particles in a shallow dish. Other solvents such as methyl and ethyl alcohol and methylene chloride could be used for preparing the coating solutions. The solvent is evaporated with the gentle heat from an infrared light, with gentle stirring. When the solvent is evaporated, the diatomaceous earth support has been coated with the sol-gel and the product is a dry free flowing hybrid organic-inorganic sol-gel coated powder.

An aluminum column tube, 2 meters long ×⅛ inch outer diameter, is filled with the dry packing by pouring the coated powder into the tube through a funnel and vibrating the column to settle the packing. Once the column is full, the column ends are stoppered with a small wad of glass wool to contain the packing. The column is then coiled to fit into the gas chromatograph. Once installed, the helium carrier gas flow is set for a flow of 40 ml./minute and the column is held for 10 minutes at 40° C. The temperature is increased at a programmed rate rise of 10° C. per minute to 150° and then at a rate rise of 15 per minute to 30° C. The column is held at that temperature for 30 minutes. This heating activates the coating and the column is ready for use. The heating also purges any residual solvent, unreacted monomers and bound water from the sol-gel structure and cross-links the network. The properties of this methyl sol-gel (MSG) packed column are compared to a prior art PDMS packed column in the section below under the heading HYDROCARBON SEPARATION.

PREPARATION OF A CAPILLARY COLUMN

Referring again to FIG. 3, to prepare a capillary column having a solid stationary phase coating of about 0.5 microns, 0.25 grams of the film-forming solution of Example B containing 0.05 grams of polymer solids is weighed into a 10 ml. volumetric flask and diluted to 10 ml. with methyl formate solvent. Methyl formate is the preferred solvent where capillary tubes are to be coated. The results with methyl formate are better than the more widely used methylene chloride. The solution is sonicated for 5 minutes to remove any dissolved gases. Approximately 1 ml. of the coating solution is placed in a reservoir. A polyimide coated fused silica tube 15 meters long with a 0.25 mm inside diameter is used as a capillary column. The column is coiled into a 9 inch diameter coil and attached to the reservoir. The coating solution is forced into one end of the column under pressure until it flows from the other end of the tube. The tube is removed from the reservoir and one end is plugged. The open end of the tube is attached to a vacuum and the rest of the column is placed in a water bath so that the column is held at a constant temperature during the evaporation of the solvent. When the solvent has been evaporated from the tube, the tube will be coated with a uniform layer of the sol-gel. The column is installed into the gas chromatograph and a flow of inert helium carrier gas is set at a pressure of 6.0 psi for a flow of approximately 0.85 ml./minute. The column is thermally activated by initially holding the column at 40° C. for 10 minutes and then increased at a rate of 10° C. per minute until the column reaches 150° C. The temperature is increased at a rate of 15° C. per minute until the column reaches 300° C., where it is held for 30 minutes. The column now contains a layer of the chromatographically activated sol-gel and is ready for use. The properties of this cyanopropyl modified methyl sol-gel (MSG) is compared with a PDMS prior art column in a section below headed HYDROCARBON SEPARATION.

It should be noted that capillary columns of the prior art and those of this invention may be prepared by the dynamic method of coating, but the method is not preferred since the static method described above provides more efficient columns. The preparation of the sol-gel may also take place in-situ, i.e. in the column, where the reactants or ingredients are combined in the usual fashion, including the methyl formate to the desired concentration, forced into a capillary column under pressure, plugged and then held in a water bath for 30 minutes at 60° C. to allow the ingredients to react in the tube. The in-situ polymerization has also been carried out without heating, as the reaction itself generates heat.

RATIOS OF MONOMERIC REACTANTS

We have typically used and prefer to use a 1:1 molar ratio of the two monomeric alkoxides. It should, however, be understood that other ratios have been and may be used to obtain useable stationary phases and adsorbents. If, for example, the amount of TEOS is held at 1 mole and the DMDES is increased in stages up to 1.25 moles, the efficiency of the columns prepared with the resulting sol-gels, as measured by the TZ values for normal alkanes, gradually decreases. At the same time, the polarity of the stationary phase of the column, as measured by the relative position of benzene to that of n-hexane, increases. If the ratio of DMDES is gradually decreased from 1.0 mole to 0.5 moles, the column efficiency gradually decreases and the polarity of the stationary phase increases. While an equimolar ratio is preferred, it is apparent from the data in Table I that other ratios are useful. The data in the following Table I and in the Tables thereafter, were obtained from sol-gels and columns prepared in accordance with the descriptions hereinabove, except as may be noted to the contrary hereinbelow. In each of the Table I examples, 1.0 moles of TEOS was used.

TABLE I

| Moles of DMDES | TZ Value | Benzene Ret. Index | Benz./Hexane Sepn. Factor |
|---|---|---|---|
| 1.0 | 34.8 | 600 | 1.00 |
| 1.05 | 33.4 | 607 | 1.07 |
| 1.13 | 33.5 | 612 | 1.12 |
| 1.25 | 24.6 | 613 | 1.13 |
| 0.95 | 35.2 | 606 | 1.06 |
| 0.80 | 30.4 | 607 | 1.07 |
| 0.75 | 30.7 | 619 | 1.20 |
| 0.50 | 23.0 | 642 | 1.35 |

RATIOS OF WATER

The most efficient columns are made with 3.5 moles of water with equimolar (1.0) ratios of the two alkoxide monomers TEOS and DMDES. It should, however, be understood that other ratios have been used and may be used to obtain useable stationary phases and adsorbents. If the water is gradually reduced, the efficiency is gradually reduced. At 3.0 moles, it is difficult to coat capillary columns because the volatiles in the solution are not readily evaporated. Increasing the moles of water to 4.0, 5.0 and 6.0 gradually causes the resulting columns to exhibit decreasing efficiency. At the same time, the polarity of the columns gradually increases. See Table II below

TABLE II

| Moles Water | TZ Value | Benzene/Hexane Separation Factor |
|---|---|---|
| 3.0 | 0 | 0 |
| 3.25 | 30.9 | 1.05 |
| 3.50 | 34.8 | 1.00 |
| 4.0 | 33.9 | 1.04 |
| 5.0 | 31.5 | 1.05 |
| 6.0 | 27.8 | 1.0 |

ACID CONCENTRATION

The hydrochloric acid catalyzes the hydrolysis and the polymerization reactions. With water content held at 3.5 moles, the amount of hydrochloric acid was varied to provide a pH of 0.8 to a pH of 4.0. Columns could be made up to about 3.0 but not at 4.00. See Table III

TABLE III

| pH | TZ | Benzene Retention Index | Benzene/Hexane Separation Factor |
|---|---|---|---|
| 0.80 | 34.2 | 618 | 1.18 |
| 1.00 | 34.8 | 600 | 1.00 |
| 1.25 | 36.4 | 603 | 1.03 |
| 1.50 | 35.6 | 601 | 1.01 |
| 1.75 | 36.9 | 601 | 1.01 |
| 2.00 | 35.0 | 601 | 1.01 |
| 3.00 | 27.9 | 616 | 1.16 |
| 4.00 | 0 | 0 | 0 |

MINERAL ACIDS

While hydrochloric acid is preferred because of convenience and availablility, other mineral acids may be used with comparable results, as is apparent from Table IV. The data was obtained from capillary columns.

TABLE IV

| Acid | pH | TZ Value | Benzene/Hexane Separation Factor |
|---|---|---|---|
| Hydrochloric | 1.0 | 34.8 | 1.00 |
| Nitric | 1.0 | 31.0 | 0.98 |
| Phosphoric | 1.0 | 33.4 | 1.02 |

ORGANIC ACIDS

Organic acids can also be used to catalyze the reaction to prepare the hybrid sol-gels. Acids such as glycolic (hydroxy acetic) and picric (trinitrophenol) were successfully used as a catalyst in the preparation of the sol-gels, as is apparent from the data in Table V. The organic acid was added to water until a pH between 2 and 3 was reached. A molar ratio of 1:1 of TEOS:DMEDS was used with 4.0 moles of ethanol as solvent and 35 moles of water. The data was obtained from capillary columns.

TABLE V

| Acid | pH | TZ Value | Benzene/Hexane Separation Factor |
|---|---|---|---|
| Glycolic | 2-3 | 33.4 | 1.04 |
| Picric | 2-3 | 32.6 | 1.05 |

SOLVENTS AND SOLVENT RATIOS

Aliphatic alcohols are most frequently used because of their favorable solubility, low cost and ready availablility. Sol-gels may be prepared with methyl, ethyl, propyl, butyl and amyl alcohols, both straight and branched chains. Other solvents such as acetone, methylethylketone, methylene chloride, methyl formate, and acetonitrile can also be used. The alcohols, having higher boiling points, are difficult to remove during the capillary coating step and prolong the coating time. The amount of solvent is typically 4 moles, however this can be increased to 8 moles and even to 12 and 16 moles. The sol-gel may also be prepared without the use of solvent. The data was obtained from capillary columns.

ALKOXYSILANE MONOMERS

The hybrid organic-inorganic sol-gels are preferably prepared from a mixture of (1) a monomeric tetraalkoxysilane having alkyl groups of 1 to 4 carbon atoms and (2) an alkoxysilane containing two or three hydrolyzable alkoxy groups and one or two non-hydrolyzable organic groups that will interact with compounds or analytes to adsorb or otherwise retain the compounds and then elute those retained compounds or analytes in discrete and distinct amounts with little and preferably no overlapping elutions. Suitable tetraalkoxysilanes (1) include the methoxy, ethoxy, propoxy and butoxy groups and mixtures thereof Suitable monomeric alkoxysilanes (2) may include as the organic moieties the heretofore described methyl group in DMDES and in methyltriethoxysilane, as well as phenyl, cyanoethyl, cyanopropyl, fluoropropyl groups and mixtures of such groups. Tests on examples of alkoxysilanes with various alkoxy groups in the preparation of sol-gels for this invention indicate that basically the same properties are obtained. The variations in the efficiency and polarity are slight as is apparent from the data in Table VI. A series of sol-gels were prepared using the following reagents and conditions:

| | |
|---|---|
| Tetraalkoxysilane | 1.0 moles |
| DMDES | 1.0 moles |
| Acetone (Solvent) | 4.0 moles |
| Water (pH of 1.0 with HCl) | 3.5 moles |

The data indicate that the methoxy and ethoxy are equivalent in terms of both efficiency and polarity, while the propoxy is slightly less efficient and slightly more polar. The butoxy is somewhat less efficient and somewhat more polar than the propoxy. The data was obtained from capillary columns.

TABLE VI

| Tetraalkoxysilane | TZ Value | Benzene/Hexane Separation |
|---|---|---|
| Methoxy | 34 | 1.06 |
| Ethoxy | 34 | 1.07 |
| Propoxy | 31 | 1.13 |
| Butoxy | 27 | 1.21. |

MIXTURE OF MONOMER AND OLIGOMER

TEOS-DMDES polymeric sol-gels were prepared by first heating TEOS, acetone and water acidified to a pH of 1 with HCl for 30 minutes to form a self-hydrolyzed and partially condensed oligomer and then adding monomeric DMDES and heating for another 30 minutes to form a sol-gel that was used to prepare capillary columns. This sol-gel produced a chromatographically active column with fair properties. The efficiency of the columns prepared with the monomer-oligomer sol-gels was not as good as the columns prepared with sol-gels from a mixture of monomers. In a number of instances, where the columns prepared from a mixture of monomers showed two peaks, only one peak was seen with the monomer-oligomer sol-gel. The most pronounced feature of this monomer-oligomer TEOS-DMDES stationary phase was its relatively high polarity. It was comparable to that of a conventional prior art PDMS column. The aromatic peaks showed some tailing. In another monomer-oligomer preparation, DMDES, acetone and water acidified with HCl to a pH of 1 was heated for thirty minutes, then TEOS was added and the heating was continued for another thirty minutes at 60° C. Capillary columns prepared with this sol-gel performed poorly. It is believed that heating only the DMDES inititially produced cyclic compounds that were simply trapped in the subsequent chains produced by the TEOS and that the DMDES was eliminated during the thermal activation step. These examples demonstrate, however, that some monomers may be partially polymerized and still produce active chromatographic stationary phases when subsequently reacted with a monomeric alkoxysilane.

METHYLTRIMETHOXY

Methyltrimethoxysilane (MTMS) was used alone without TEOS to prepare a series of sol-gels. The MTMS was held at 1.0 moles and the solvent acetone was held at 4.0 moles. Water adjusted to a pH of 1 with HCl was varied from 0.75 to 3.0 moles The reaction was carded out in a closed container with stirring for 30 minutes at 60° C. The data was obtained from capillary columns. The performance data for the columns is shown in Table VII below.

TABLE VII

| Water | TZ |
|---|---|
| 3.0 moles | 23.9 |
| 2.5 | 22.6 |
| 2.25 | 23.0 |
| 2.0 | 23.3 |
| 1.75 | 27.0 |
| 1.5 | 25.5 |
| 1.0 | 0 |
| 0.75 | 0 |

The chromatographic columns with stationary phases made with the MTMS sol-gels produced columns with active chromatographic properties. The best column, made with the MTMS sol-gel with 1.75 moles of water, showed generally poorer column efficiency than columns made with sol-gels made with TEOS and DMDES. The MTMS columns tended to give peaks for branched hydrocarbons that were relatively broad. With 1.0 moles of water and less, the coating solutions did not evaporate and no columns were prepared. This example demonstrates that homopolymers prepared from a single organic substituted alkoxysilane can produce stationary phases that are chromatographically active.

DIPHENYLDIMETHYLETHOXYSILANES

A series of sol-gels were prepared which contained both phenyl and methyl substituents. These sol-gels were made with 1.0 moles of TEOS and 1.0 moles in total of mixtures of diphenyldiethoxysilane (DPDES) and dimethyldiethoxysilane (DMDES). The phenyl and methyl content was calculated to give sol-gels with a phenyl weight percentages varying from 5 to 50%, based on the total weight of the methyl and phenyl groups in the reactant monomers DPDES and DMDES. Five formulations were prepared, as listed in Table VIII below. Four moles of methyl alcohol solvent was used. The water was acidified to a pH of 1.0 with HCl and 3.5 moles were employed. The reaction was carried out in a closed container at 60° C., with stirring for 30 minute The data was obtained from capillary columns. TZ values were measured from the n-alkanes and polarity measured from the hexane and benzene peaks. Values are presented below

TABLE VIII

| Sol-Gel Compositions | TZ Value | Benzene/hexane Separation Factor |
|---|---|---|
| 5% Phenyl-95% Methyl | 34.2 | 1.03 |
| 10% Phenyl-90% Methyl | 34.3 | 1.00 |
| 20% Phenyl-80% Methyl | 35.0 | 1.00 |
| 35% Phenyl-65% Methyl | 31.3 | 1.04 |
| 50% Phenyl-50% Methyl | 30.0 | 1.09 |

The above table shows that columns with good efficiency were obtained with a decrease in efficiency noted with increasing phenyl content. There was a slight increase in polarity with the higher phenyl content sol-gels, but not as great as anticipated. Infrared studies of these polymers verified the presence of the phenyl group with increasing intensities of the phenyl frequencies as the phenyl content was increased. It is thought that the phenyl groups in the polymer may be oriented into the body of the polymer and thus are not present on the surface of the polymer. If they are not on the surface of the polymer, they may not interact chromatographically as readily as those on the surface.

CYANOPROPYLSILOXANES

The 3-cyanopropyl group was incorporated into the hybrid organic-inorganic sol-gel polymer by employing the monomer 3-cyanopropyltriethoxysilane as another example of a trifunctional silicon alkoxide containing an organic moiety that will interact with analytes as a functioning stationary phase. Sol-gels were prepared from the following monomers and molar ratios:

| | |
|---|---|
| TEOS | 1.0 mole |
| DMDES | 0 to 0.90 moles |
| 3-cyanopropyltriethoxysilane (CPTES) | 1.0 to 0.10 moles |
| Acetone (Solvent) | 4.0 moles |
| Water pH of 1 with HCl | 3.5 moles |

The reaction was run for 30 minutes at 60° C. in a closed container. A series of sol-gels were prepared and the resulting columns were tested for efficiency and polarity. The data was obtained from capillary columns. As is apparent from Table IX, as the CPTES content is increased, the TZ values, that is the column efficiency decreased, and the polarity or the separation of benzene and hexane increased. The test chromatogram on the 100% CPTES example gave extremely poor peaks for the aliphatics. In comparison, the peaks for benzene and toluene in the test chromatograms which were also in the test mixture, were relatively sharp. The preparation of the methyl and 3-cyanopropyl sol-gel only allows for the preparation of a narrow range of stationary phases which are lower in polarity than conventional silicone phases. A molar ratio of DMDES to CPTES of about 0.8 to 0.2 is preferred, particularly for analyzing hydrocarbons.

TABLE IX

| Data or Monomer | Monomer Molar Ratios | | | |
|---|---|---|---|---|
| DMDES | 90 | 80 | 50 | 0 |
| 3-Cyanopropyltriethoxysilane | 10 | 20 | 50 | 100 |
| TZ Value | 35.6 | 30.0 | 19 | 6 |
| Benzene/Hexane Separation Factor | 1.11 | 1.20 | 1.39 | 1.47 |

FLUOROPROPYL POLYMERS

The 3,3,3-trifluoropropyl group was incorporated into the sol-gel to modify the polarity of the stationary phase and to allow for the separation of mixtures not separated by the other heretofore described stationary phases. The 3,3,3-trifluoropropyl group was incorporated into the sol-gel by employing the monomer 3,3,3-trifluoropropyltrimethoxysilane and the methyl group was incorporated into the sol-gel by employing the monomer dimethyldimethoxysilane. The following formulation was used:

| | |
|---|---|
| TEOS | 1.0 moles |
| DMDES | 0.8 moles |
| 3,3,3-trifluoropropyltrimethoxysilane | 0.2 moles |
| Acetone (Solvent) | 4.0 moles |
| Water pH of 1.0 with HCl | 3.5 moles |

The reaction was run for 30 minutes at 60 degrees C. in a closed container. The data was obtained from capillary columns prepared in accordance with the descriptions hereinabove except as noted. The efficiency and polarity data is listed in Table X below. This stationary phase exhibits less polarity than the 20 mole percent 3-cyanopropyl stationary phase but greater polarity than the all methyl stationary phase.

TABLE X

| Monomer | Molar Percentage | TZ Value | Benzene/Hexane Separation Factor |
|---|---|---|---|
| Dimethyldimethoxysilane | 80 | 29.8 | 1.14 |
| 3,3,3-trifluoropropyl-trimethoxysilane | 20 | | |

SURFACE AREAS OF STATIONARY PHASES

The heretofore described EXAMPLE A sol-gel material prepared with DMDES is also referred to for convenience hereinbelow as the methyl sol-gel polymer or MSG. The heat activated stationary phases prepared from the EXAMPLE A MSG sol-gel and similar sol-gels can be used for gas chromatography in either packed or capillary columns. It should be apparent that such stationary phases in both types of columns have exceptionally high surface areas, surface areas that are not available with any of the widely used prior art PDMS stationary phases. Stationary phases prepared from such sol-gels are porous solids with surface areas ranging between about 200 to 300 square meters per gram. Chromatographically it causes separation by the interaction of its surface with the sample being analyzed. The methyl group is believed to be essentially at or near the surface of the hybrid organic-inorganic material. It has properties similar to but nonetheless superior to that of the widely used polydimethylsiloxane (PDMS) liquid phase. The high surface areas which accompany the stationary phases of this invention are illustrated most conveniently by determining the surface areas of EXAMPLE A MSG coated Chromosorb P 100/120 calcined diatomaceous earth particles. The surface areas are shown in Table XI for uncoated particles and with coatings varying in weight percentages from 1 to 35% by weight based on the total weight of the particles. The surface area was measured by the well known B. E. T. Nitrogen Physical Adsorption method. Since the packing is used in a column on a volume basis, the surface area per unit weight (meter$^2$/gram) is converted using the packing density of the packing to surface area per unit volume (meter$^2$/cc.). A 2 meter by 2 min. inside diameter column would hold a volume of 6.36 cc. of packing and surface area of this volume for each packing is shown in the last column on the right. We believe that the high surface areas of the MSG coated support particles is because the activated MSG coating has been converted to a solid porous material.

TABLE XI

| Stationary Phase | % Coating | Surface Area m$^2$/gram | Surface Area m$^2$/cc. | Surface Area m$^2$/6.36 cc. |
|---|---|---|---|---|
| Uncoated | 0 | 4.5 | 2.0 | 12.6 |
| MSG | 1.0 | 5.8 | 2.6 | 16.4 |
| MSG | 2. | 10.3 | 4.7 | 29.6 |
| MSG | 5.0 | 17.2 | 8.3 | 52.3 |
| MSG | 15.0 | 42.7 | 22.6 | 142 |
| MSG | 25.0 | 65.9 | 39.5 | 249 |
| MSG | 35.0 | 90.9 | 61.8 | 389 |

The PDMS stationary phase acts as a liquid phase even when highly cross-linked and bonded to the capillary surface. When coated on the Chromasorb P 100/120 particulated solid support, the PDMS apparently fills the voids in the support and reduces the surface area. This is shown in Table XII. The porous solid MSG coated particles clearly have far higher surface areas.

TABLE XII

| Stationary Phase | % Coating | Surface Area m$^2$/g |
|---|---|---|
| PDMS | 10 | 1.2 |
| PDMS | 15 | 1.2 |
| PDMS | 25 | 0.5 |
| PDMS | 35 | 0.3 |

SEPARATING PROPERTIES OF MSG

As has been noted heretofore, the activated methyl sol-gel or MSG stationary phases of this invention have properties which are different from and improved over the properties of prior art stationary phases, including the conventional polydimethylsiloxane (PDMS) stationary phase. The retention index value of MSG is less than that of squalane, a $C_{19}$ long chain shark's liver oil product, the least polar of organic stationary phases. It follows, of course, that the MSG McReynolds value for benzene is negative. The MSG phase elutes hydrocarbons more closely aligned to their boiling point than does either squalane or PDMS. The MSG stationary phase elutes hydrocarbons in carbon number groups, that is, there is not an overlap of the last member of a group with the first members of the following group. These properties will be illustrated by the following tests.

Figure 4B:
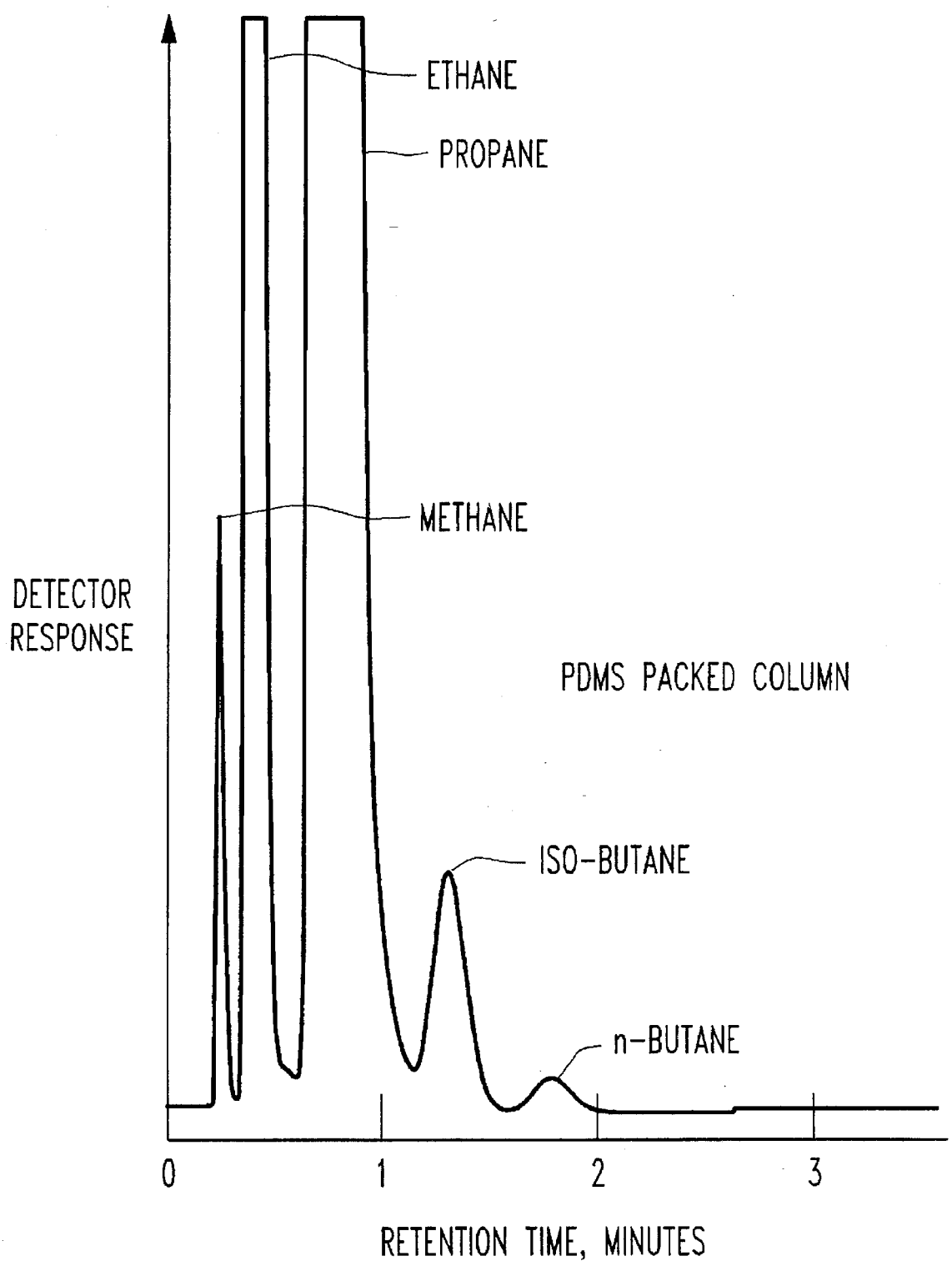

The retention index values for MSG have been determined with a packed column and from these the McReynolds constants have been calculated. The data for squalane is from the publication of W. O. McReynolds in J. Chromatogr. Sci. 8, 685 (1970). SE-30, a commercially available PDMS made by the General Electric Corporation, was coated on a chromatographic support. The MSG data was obtained on a packed column where the packing contained about 20 weight percent of MSG on Chromosorb W HP 80/100 mesh available from the Celite Corporation. This packing was made in the same manner as that employed in the preparation of 35% MSG on Chromosorb P described hereinabove and in conjunction with the column employed in generating the chromatogram of FIG. 4B. The packing was in a glass tube column 6 feet long with a 2 min. inside diameter. The temperature was at a constant 120° C. and the inert helium gas flow rate was 40 ml./min. From Table XIII it is seen that for benzene, the MSG is less polar than squalane, the most nonpolar stationary phase, and the PDMS SE-30. For the polar compounds, butanol, 2-pentanol and nitropropane, the MSG is somewhat more polar than the PDMS. The pyridine value for MSG could not be determined because of severe tailing.

The retention index value is the carbon number of a compound relative to that of the log of the normal hydrocarbons with the column operated isothermally. The benzene value of 628 for MSG indicates that it is eluted between n-hexane (600) and n-heptane (700) and has a value of 6.28 carbon units. The benzene value of 653 for SE-30 indicates that it has a value of 6.53 carbon units. This means that on a MSG column, benzene is eluted earlier relative to heptane than on a SE-30 column

TABLE XIII

| Compound | Retention Index MSG | Retention Index Squalane | McReynolds Constants MSG | McReynolds Constants SE-30 |
|---|---|---|---|---|
| Benzene | 628 | 653 | −25 | 15 |
| Butanol | 734 | 590 | 144 | 53 |
| 2-Pentanone | 758 | 627 | 131 | 44 |
| Nitropropane | 726 | 652 | 74 | 64 |
| Pyridine | — | 699 | — | 41 |

The retention index and McReynolds constant for benzene were also determined with the MSG stationary phase with a coating thickness of 0.40 microns. The column temperature was varied from 60 to 100° C. The values are listed in the following table.

TABLE XIV

| Column Temperature | Retention Index | McReynolds No. |
|---|---|---|
| 100° C. | 620 | −33 |
| 80 | 613 | −30 |
| 70 | 610 | −43 |
| 60 | 607 | −46 |

The McReynolds constants for benzene with several low polarity silicone stationary phases, as reported by Supelco Inc. in their newsletter, The Reporter, Vol 13, No. 2 (1994), page 2, and with that measured for MSG, is listed in the table below. All data was at 70° C.

TABLE XV

| Phase | McReynolds - Benzene |
|---|---|
| MSG | −43 |
| Squalane | 0 |
| SPB-Octyl (50% octyl, 50% methyl) | 3 |
| SPB-1 (100% methyl) | 4 |

RETENTION TIMES-PDMS vs. MSG

A study of the retention time and the amount of stationary phase has shown that the activated methyl sol-gel (MSG) gives a greater retention time for a given compound than a comparable amount of polydimethylsiloxane (PDMS). The difference in retention time is believed to be explained by the high surface area of the MSG. This greater retention time phenomenon of the MSG was found to be true with both packed and capillary columns. This property of MSG is a unique one in gas chromatography and combines the general properties of materials used in gas-liquid chromatography with the high retention found in gas-solid chromatography.

The greater retention time allows for the separation of low boiling mixtures at convenient oven temperatures. Conventional stationary phases frequently require the use of expensive subambient oven operation, with the use of liquid nitrogen and carbon dioxide to reach their required operating temperatures. A conventional stationary phase in a packed column could achieve the separation of low boiling compounds with very long columns, at the expense of time. The greater retention time properties of the MSG phase allows for the use of thinner films in capillary columns and lower percent coatings in packed columns, both of which contribute to higher column efficiency.

Packed columns

The retention time of decane was compared with a series of packed columns with varied amounts of stationary phase coated on 100/120 mesh Chromosorb P, acid washed grade. The PDMS used in this comparison was DC-200 (100,000 centistoke grade) commercially available from Dow Coming Corporation. The weight percentages set forth in the table below are the weight of the particular stationary phase based on the total weight of the coated particles. The column tubing in each case was 2 meters ×⅛ inch outer diameter aluminum. The MSG packed columns were prepared with the EXAMPLE A sol-gels. The MSG columns were heated at 300° C. for one hour with carder gas flow to activate and condition them. The PDMS columns were conditioned at 200° C. for two hours with a flow of carder gas. All of the packed columns were operated starting at 40° C. and a temperature increase programmed at 10° C./minute to a temperature which eluted the decane peak. The retention time and elution temperature for decane for both sets of columns are set forth in the following table. From a plot of retention time vs. percentage of stationary phase data set forth in the table, it is estimated that for 5% MSG with a retention time of 12/85 minutes, the equivalent amount of PDMS would be 30 % and for 10% MSG, the equivalent amount of PDMS would be 38%. For higher amounts of MSG, the PDMS equivalent values are too far off the plot to be accurately estimated.

TABLE XVI

| Phase | Coating Percent | Decane Retention Time, Minutes | Decane Elution Temp. °C. |
|---|---|---|---|
| PDMS | 15 | 10.80 | 148 |
| PDMS | 25 | 12.39 | 164 |
| PDMS | 35 | 13.6 | 164 |
| MSG | 05 | 12.85 | 168.5 |
| MSG | 15 | 14.70 | 187 |
| MSG | 25 | 17.12 | 211.2 |
| MSG | 35 | 19.45 | 234.5 |

Capillary Columns

The retention time of decane was compared in a series of capillary columns with varied film thicknesses in fused silica capillary columns. The PDMS columns were 15 meters long ×0.25 mm inside diameter containing bonded methyl silicone obtained from the Restek Corporation. Five MSG columns, also 15 meters×0.25 mm ID were used. The MSG capillary columns were prepared from the EXAMPLE B MSG sol-gel. The PDMS columns were conditioned with carrier gas flow at 200° C. for two hours. The MSG columns were treated with a carrier gas flow at 300° C. for one hour to activate and condition them. All of the columns were operated starting at 40° C. and programmed at 5° C./minute rise to a temperature which eluted the decane peak. A carrier gas velocity of 35 cm/sec helium was used for all of the capillary columns. A plot of the film thicknesses vs. retention times of the decane provides an estimate of equivalent thicknesses of the two stationary phases. From the plot and expressed in microns, a 0.20 MSG film is equivalent to 1.30 of PDMS, a 0.40 film of MSG is equivalent to 1.55 of PDMS, a 0.60 MSG film is equivalent to 180 of PDMS and a 0.80 MSG film is equivalent to 1.90. of PDMS. The data is presented in the table below.

TABLE XVII

| Phase | Film thickness Microns | Decane Retention Time, Minutes | Decane Elution Temperature, °C. |
|---|---|---|---|
| PDMS | 0.25 | 7.39 | 77.0 |
| PDMS | 0.40 | 9.26 | 86.3 |
| PDMS | 1.00 | 12.96 | 104.8 |
| MSG | 0.20 | 15.08 | 115.4 |
| MSG | 0.40 | 16.98 | 124.9 |
| MSG | 0.60 | 19.00 | 135.0 |
| MSG | 0.80 | 19.79 | 139.0 |

HYDROCARBON SEPARATION

It has been further determined that the EXAMPLE B MSG stationary phase in capillary columns has the ability to separate aliphatic hydrocarbons by carbon number and largely by boiling point. For the separation of aliphatic hydrocarbons, the MSG elutes the members of a given carbon number as a group before the next carbon number is eluted. As an example, the five carbon aliphatic hydrocarbons are eluted without overlap into the six carbon group. The six carbon group is eluted without overlap into the seven carbon group. In the six carbon group, benzene, methylcyclopentane and cyclohexane are eluted before the first of the seven carbon aliphatics. The lowest boiling eight carbon aliphatic, 2,2,4-trimethylpentane, is eluted after the seven carbon group.

The paraffinic hydrocarbons, i.e. the cyclic paraffins, and the aromatic hydrocarbons are eluted also by carbon number with the aliphatic hydrocarbons but with a slight retardation of the elution. This allows the aromatics, that is benzene, toluene, ethylbenzene and the xylenes to be eluted in the spacing between the carbon groupings without interference. The paraffinic hydrocarbons are also delayed, but to a lesser extent, without the interference of the aliphatic and aromatic hydrocarbons. As an example, cyclohexane and benzene are eluted separately after n-hexane and before any of the branch chain heptanes. Toluene is eluted after n-heptane and before any of the branch chain octanes.

These separating characteristics of the MSG overcome many problems encountered with the PDMS columns now commonly used for hydrocarbon separation. The PDMS stationary phase elutes the high boiling components on one carbon number among the low boiling components to the next carbon number. As an example, the five carbon cyclopentane is eluted with the six carbon 2,3-dimethylbutane. Benzene and cyclohexane are eluted among the branch chain heptanes. The lower boiling eight carbon trimethylpentanes are eluted with heptanes and 2,3,3-trimethylpentane is eluted with toluene. In order to separate these two components in gasoline samples, a 150 meter PDMS capillary column is used to obtain a 50% separation of toluene and 2,3,3-trimethylpentane.

In contrast, the 15 meter MSG capillary column will elute all of the trimethylpentanes after toluene and achieve a 100% separation of toluene and the lowest boiling 2,2,4-trimethylpentane. Another difficult pair to separate in gasoline is benzene and methylcyclopentene-1. Again, a very long PDMS capillary is needed for this separation. A 15 meter MSG capillary will readily give this separation.

Figure 5B:
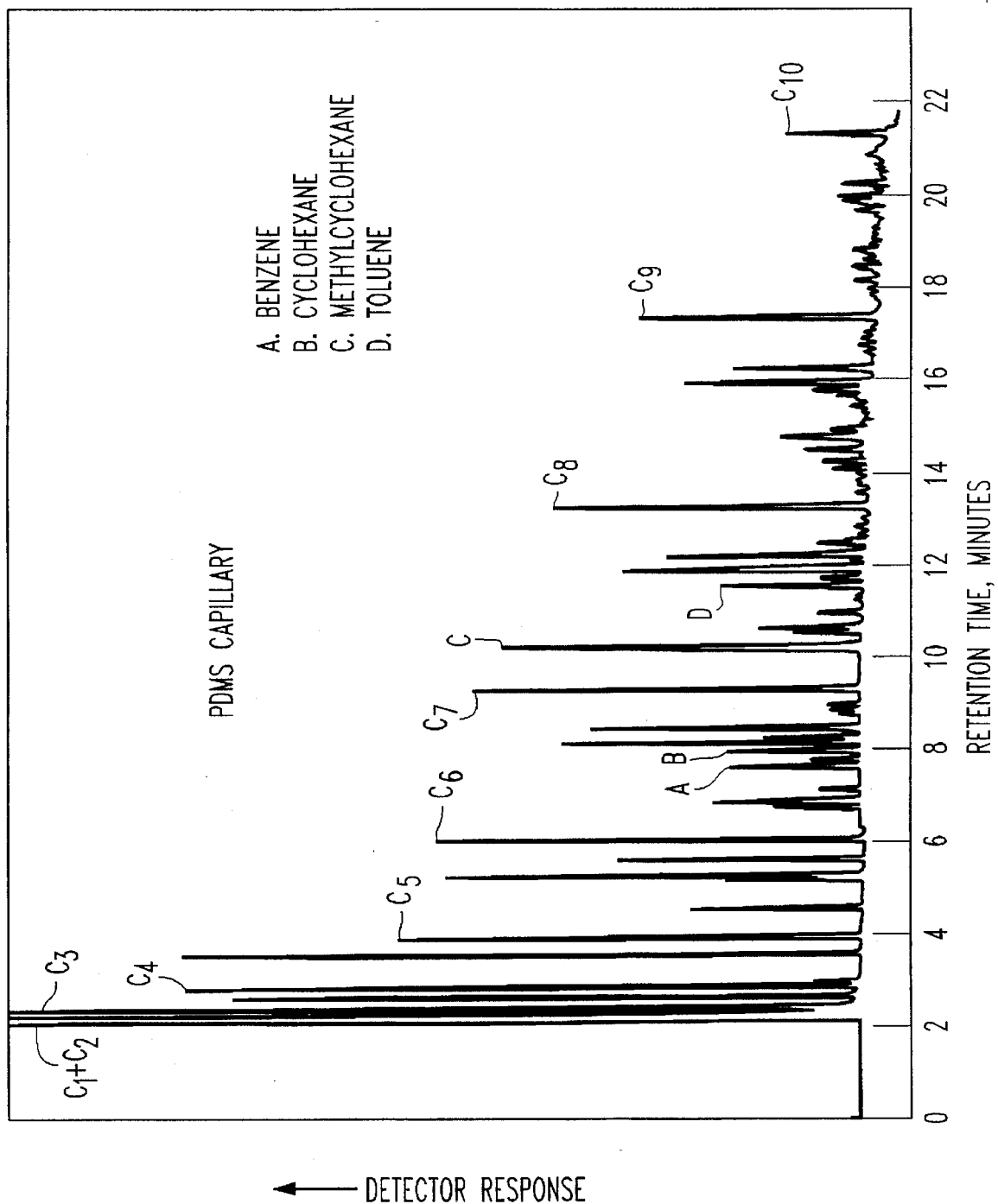

The separation of a complex mixture of hydrocarbons by the EXAMPLE B MSG and PDMS capillary columns was conducted in the Perkin-Elmer equipment described hereinabove and generally illustrated in FIG. 1. The PDMS capillary was a RTX-1 from the Restek Corporation of Bellefont, Pa. and was 30 meters in length and had an inside diameter of 0.25 mm with a PDMS film of 1.0 micron. Both columns were operated at an initial temperature of 40° C. for 2 minutes, then increased at a programmed rate increase of 5° C. per minute until the last peak n-decane, was eluted. The carrier gas was helium in both cases. For the MSG column, the helium velocity was 32 cm./sec. (its optimum) and 22 cm./sec. for the RTX-1 column (its optimum). A natural gas sample of 0.5 ml was used with a split ratio of about 40:1. The detector attentuation was reduced from an initial 64× to 1× stepwise in order to detect the minor components. The resulting chromatograms are shown in FIGS. 5, where 5A is the MSG column and 5B is the PDMS column. The peaks for the normal hydrocarbons from C1 to C10, the aromatics, and the cycloparaffins are marked. The chromatograms also show the greater retention by the MSG stationary phase compared to the PDMS stationary phase. Even though the MSG film thickness is one-half of the thickness of the PDMS film and the length of MSG column is one-half of the length of the PDMS column, the retention of the C10 compounds was about the same for both columns.

One can readily see the sequential elution of carbon number groups with the MSG column, while the PDMS displays an overlap of the groups. An even better illustration of the advantages associated with the MSG columns of this invention compared to the PDMS columns in the separation of hydrocarbons, is apparent from the retention values obtained by injecting into each column pure hydrocarbon standards. Table XVIII is/he data obtained with the MSG column and Table XIX records the data obtained with the PDMS column. The undesirable overlap of carbon numbers obtained with the PDMS column, and the superiority of the MSG column, is apparent from the data in these Tables and in the chromatograms of FIGS. 5.

TABLE XVIII

METHYL SOL-GEL COLUMN

|  | Boiling Point | Retention Time |
|---|---|---|
| Five Carbons | | |
| 2,2-dimethylpropane | 9.5 | 1.78 |
| 2-methylbutane | 27.9 | 2.37 |
| n-pentane | 36.1 | 2.72 |
| cyclopentane | 49.5 | 3.03 |
| Six Carbons | | |
| 2,2-dimethylbutane | 49.7 | 4.48 |
| 2,3-trimethylbutane | 58.0 | 5.06 |
| 2-methylpentane | 60.3 | 5.20 |
| 3-methylpentane | 63.3 | 5.45 |
| methylcyclopentane | 72.0 | 5.57 |
| n-hexane | 68.7 | 5.89 |
| methylcyclopentene-1 | 75.8 | 6.03 |
| cyclohexane | 80.8 | 6.23 |
| benzene | 80.1 | 6.49 |
| Seven Carbons | | |
| 2,2dimethylpentane | 79.9 | 7.94 |
| 2,2,3-trimethylbutane | 79.9 | 8.10 |
| 2,4-dimethylpentane | 80.5 | 8.10 |
| 3,3-dimethylpentane | 86.0 | 8.56 |
| 2,3-dimethylpentane | 89.7 | 9.01 |
| 2-methylhexane | 90.0 | 9.15 |
| 3-methylhexane | 92.0 | 7.08 |
| methylcyclohexane | 100.9 | 9.33 |
| n-heptane | 98.4 | 9.83 |
| toluene | 110.6 | 10.71 |
| Eight Carbons | | |
| 2,2,4-trimethylpentane | 99.2 | 11.00 |
| 2,3,4-trimethylpentane | 113.5 | 11.32 |
| 2,3,3-trimethylpentane | 114.8 | 11.34 |
| n-octane | 125.7 | 13.72 |
| ethylbenzene | 136.2 | 14.49 |
| m,p-xylene (one peak) | 139.1  138.4 | 14.70 |
| o-xylene | 144.4 | 15.28 |

TABLE XIX

PDMS COLUMN

|  | Carbons Number | B.P | Ret. Time |
|---|---|---|---|
| 2,2-dimethylpropane | 5 | 9.5 | 2.97 |
| 2-methylpentane | 5 | 27.9 | 3.58 |
| n-pentane | 5 | 36.1 | 3.93 |
| 2,2-dimethylbutane | 6 | 49.7 | 4.56 |
| cyclopentane | 5 | 49.5 | 5.19 |
| 2,3-dimethylbutane | 6 | 58.0 | 5.19 |
| 2-methylpentane | 6 | 60.3 | 5.27 |
| 3-methylpentane | 6 | 63.3 | 5.62 |
| n-hexane | 6 | 68.7 | 6.05 |
| 2,2-dimethylpentane | 7 | 78.9 | 6.76 |
| methylcyclopentane | 6 | 72.0 | 6.90 |
| 2,4-dimethylpentane | 7 | 80.5 | 6.90 |
| 2,2,3-trimethylbutane | 7 | 79.9 | 7.16 |
| methylcyclopentene-1 | 6 | 75.8 | 7.59 |
| benzene | 6 | 80.1 | 7.66 |

TABLE XIX-continued

PDMS COLUMN

|  | Carbons Number | B.P | Ret. Time |
|---|---|---|---|
| 3,3-dimethylpentane | 7 | 86.0 | 7.80 |
| cyclohexane | 6 | 80.8 | 7.99 |
| 2-methythexane | 7 | 90.0 | 8.16 |
| 2,3-dimethylpentane | 7 | 89.7 | 8.26 |
| 3-methylhexane | 7 | 92.0 | 8.47 |
| 2,3-dimethylpentane | 7 | 89.7 | 8.26 |
| 3-methylhexane | 7 | 92.0 | 8.47 |
| 2,2,4-trimethylpentane | 8 | 99.2 | 8.98 |
| n-heptane | 7 | 98.4 | 9.33 |
| methylcyclohexane | 7 | 100.9 | 10.25 |
| 2,3,4-trimethylpentane | 8 | 113.5 | 10.25 |
| toluene | 7 | 100.6 | 11.57 |
| 2,3,3-trimethylpentane | 8 | 114.8 | 11.57 |

Packed columns also employ the use of the MSG stationary phase and in this mode also exhibit the low polarity seen with capillary columns as well as the greater retention characteristics. This is demonstrated in FIGS. 4A and 4B where the properties of the 2 meter ×⅛ inch packed columns with the 35% MSG stationary phase material described in the section hereinabove headed PREPARATION OF A PACKED COLUMN may be compared to a comparable packed column containing a 35% PDMS stationary phase material (DC-200) obtained from the Dow Corning Corp. In both cases, the temperature was 40° C. and the gas flow rate was 40 ml/min. The FIG. 4A chromatogram illustrates that the MSG column has a greater retention and greater efficiency than the PDMS chromatogram, illustrated in FIG. 4B, for the separation of the C1 to C5 hydrocarbons. Under the same operating conditions, this MSG column will separate air from methane and carbon dioxide from ethane.

SURFACE SILANIZATION

It is known that the surfaces of sol-gels are populated with silanol groups. The silanol groups cause species which hydrogen bond, for instance alcohols and other oxygenated compounds, to interact as they pass through the column and contact the stationary phase surface. This interaction causes the band or peak to be eluted from the column as an asymmetric peak rather than a symmetrical one. The asymmetrical peak drastically reduces column efficiency and makes quantitation difficult or impossible. This peak asymmetry is commonly referred to as tailing and is commonly dealt with in gas chromatography by reacting the surface silanols with a reagent that converts the silanol group to a silanol ether. This is commonly done to deactivate the surface of glass and fused silica capillary columns and the surface of diatomaceous earth supports used in packed columns. The presence of the surface silanol groups also contributes to the polarity of the stationary phase. The silanization of the surface not only reduces the tailing effect, but also reduces the polarity of the stationary phase.

The column is treated with a silanizing agent such as hexamethyldisilzane (HMDS) or HMDS and trimethylchlorosilane (TMCS). The TMCS is used to enhance the HMDS treatment. The silanization can take place after the column has been coated and thermally activated at 300° C. As an alternative, the silanization can be carried out after a partial drying of the sol-gel at 125° C., then silanizing during the thermal activation step at 300° C. For a 15 meter column, a 100 to 200 microliter slug of the silanizing reagent is moved slowly through the column under pressure with an inert gas. Once the excess reagent is expelled from the exit end of the column, the column is purged for a short period of time to eliminate air from the column. The column is flame sealed and then heated for a period of one to four hours at a temperature ranging from 200° to 30° C. If the silanization is carried out on the partially dried sol-gel, the heat treatment is carried out at 300° C. for thirty minutes to an hour. At the end of the heat treatment, the column is cooled and rinsed with methylene chloride and then conditioned with a flow of a carrier gas at 200° C. for an hour to eliminate any residual silanizing reagent and methylene chloride. The silanizing treatment reduces the tailing effect of alcohol and other hydrogen bonding compounds and allows these compounds to be eluted from the column as symmetrical peaks. In addition, the silanization reduces the polarity of the column. In a column which has been prepared, tested, and then silanized, the elution of benzene will be shifted. In the untreated column, benzene is eluted after hexane, while after silanization, it is eluted before hexane. The same situation is found with the elution of heptane and toluene. Separation factors are listed for these pairs in Table XX, below. The treated column was silanized with HMDS in a sealed column, heated at 275° C. for two hours.

TABLE XX

| Column | Benzene/hexane Separation Factor | Toluene/heptane Separation Factor |
|---|---|---|
| Untreated | 1.08 | 1.08 |
| Treated | 0.93 | 0.96 |

If the treatment was carried out at various lower temperatures, the shift of the benzene would be such that the benzene could be eluted just after hexane, with hexane or just before hexane. The silanization treatments can be used as a tool to carefully adjust the polarity of the column. With the 0.93 separation factor listed above, benzene would be eluted with methylcyclopentane.

COLLECTION OF ORGANICS

Frequently, organic compounds in air and water are at such low concentrations that they cannot be determined. To deal with this problem, the organics in air and water are concentrated by running a large measured volume of air or water through a trap column containing an adsorbent which has a high affinity for the organics. The organics are removed from the trap by either extraction with a small amount of solvent or thermal desorption. With the organics concentrated, they can be more readily identified and measured by appropriate analyses.

For trapping organics present in air, adsorbents used are, in many cases, column packings for gas chromatography. The trap column filled with the adsorbent is operated at room temperature and is highly retentive for many organics. Generally the plan is to trap a specific compound or a specific group of compounds. In the development of the method, a trap is prepared with an adsorbent that will retain that compound or group of compounds. These compounds may be recovered from the trap by extraction or thermal desorption after a large volume of measured air has passed through it.

For the trapping of organics present in water, adsorbents used are both adsorbents used as gas chromatography packings as well as packings that are used for liquid chromatography. Again, the trap is developed to retain a specific compound or group of compounds which are concentrated on the adsorbent and then recovered from the adsorbent after a large volume of water has passed through the trap.

Figure 6A:
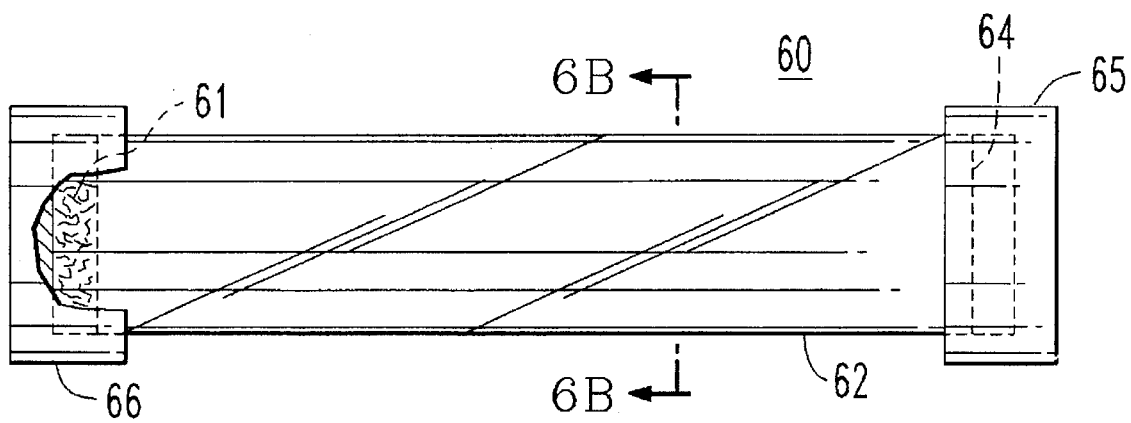
Figure 6B:
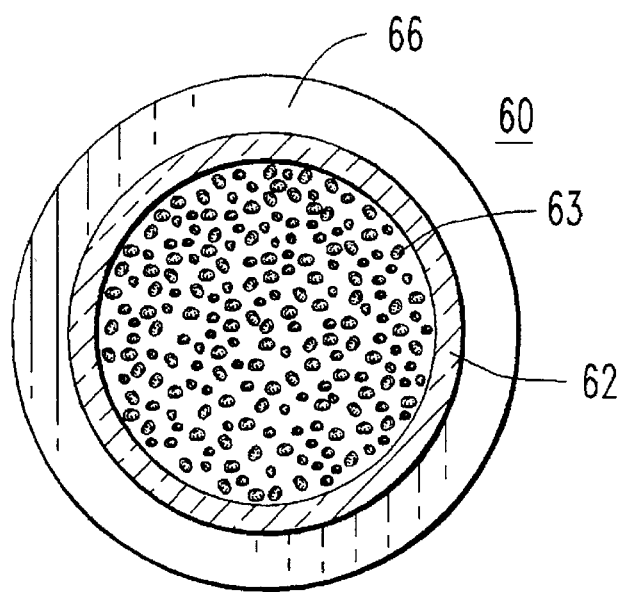

The sol-gel polymers of this invention can be deposited on a chromatographic support or other suitable support material and then be used to concentrate organics from either air or water prior to being analyzed. The MSG polymer can be used to collect and concentrate hydrocarbons as well as other organics from the air and water when used as a packing in adsorbent cartridges. The Chromosorb P 100/120 particles, for example, can be coated with a sol-gel that has been described as part of this invention for chromatographic use. Referring now to FIGS. 6A and 6B, the cartridge 60 is made by inserting a loosely woven glass wool plug 61 into one end of the glass tube 62. The coated sol-gel particles 63 are introduced into the tube through the other open end. The tube may be vibrated to compact the particles in the tube. The other end of the tube is closed with the glass wool plug 64. This high surface area adsorbent, if not already activated, can be activated by passing a heated stream of gas through the tube. Connector fittings 65, 66 are attached to the tube 62 so the tube may be conveniently connected into gas or water lines with complementary fittings. The cartridge can be used in-line, for example, to collect organics by passing large amounts of air or water through it, collecting and concentrating the organics on the adsorbent particles. The organics can be removed from the packing by either extraction with an organic solvent or by thermal desorption. In either case, the organics may then be analyzed by appropriate means such as gas chromatography. The MSG sol-gel may also be coated on a wire or rod, heated to activate the coating and inserted into gas or liquids to collect organics in another manner for later analysis.

We claim:

1. A column comprising a solid support, an adsorbent coating deposited upon the support, the coating comprising a hybrid organic-inorganic material which is the hydrolyzed and condensed reaction product of an alkoxysilane having four hydrolyzable alkoxy group, each group having from 1 to 4 carbons and at least one organoalkoxysilane having a hydrolyzable alkoxy group and a non-hydrolyzable organic group.

2. The column of claim 1 wherein the alkoxysilane is tetraethoxysilane.

3. The column of claim 2 wherein the organoalkoxysilane is dimethyldiethoxysilane.

4. The column of claim 1 wherein the organoalkoxysilane is a mixture of at least two organoalkoxysilanes, each having a different non-hydrolyzable organic group.

5. The column of claim 1 wherein the reaction product is derived from a mixture of monomers, wherein the alkoxysilane is a monomer having the formula:

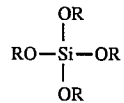

wherein R is an alkyl group having from 1 to 4 carbons and the organoalkoxysilane is a monomer having the formula:

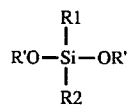

wherein R' is selected from the group consisting of methyl and ethyl groups, R1 is selected from the group consisting of hydrogen, methyl, phenyl, cyanoethyl, cyanopropyl, and trifluoropropyl groups and R2 is selected from the group consisting of methyl, phenyl, methoxy and ethoxy groups.

6. The column of claim 5 wherein the molar ratio of alkoxysilane to organoalkoxysilane is from 1 to about 0.5 to 1.25.

7. The column of claim 6 wherein the molar ratio is about equimolar.

8. The column of claim 6 wherein the alkoxysilane is tetraethoxysilane and the organoalkoxysilane is selected from the group consisting of dimethyldimethoxysilane, dimethyldiethoxysilane, methyltrimethoxysilane, diphenyldiethoxysilane, phenylmethyldimethoxysilane, phenylmethyldiethoxysilane, 3-cyanopropyltriethoxysilane, 2-cyanoethyltriethoxysilane, (3,3,3-trifluoropropyl)trimethoxysilane, methyldimethoxysilane and methyldiethoxysilane.

9. The column of claim 6 wherein the alkoxysilane is tetraethoxysilane and the organoalkoxysilane is a mixture of dimethyldiethoxysilane and another organoalkoxysilane having a non-hydrolyzable organic substituent other than methyl.

10. The column of claim 6 wherein the alkoxysilane is tetraethoxysilane and the organoalkoxysilane is a mixture of dimethyldiethoxysilane and 3-cyanopropyltriethoxysilane.

11. The column of claim 1 wherein the non-hydrolyzable organic group is chromatographically active.

12. The column of claim 11 wherein the hybrid organic-inorganic material has a surface and the non-hydrolyzable chromatographically active group is distributed at or near the surface.

* * * * *